United States Patent
Hamada et al.

(12) United States Patent (10) Patent No.: US 8,575,076 B2
Hamada et al. (45) Date of Patent: *Nov. 5, 2013

(54) SLIDING MEMBER AND PRODUCTION PROCESS THEREOF

(75) Inventors: Takahiro Hamada, Yokohama (JP); Makoto Kano, Yokohama (JP); Yutaka Mabuchi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 764 days.

This patent is subject to a terminal disclaimer.

(21) Appl. No.: 12/256,141

(22) Filed: Oct. 22, 2008

(65) Prior Publication Data

US 2009/0054277 A1 Feb. 26, 2009

Related U.S. Application Data

(62) Division of application No. 10/912,541, filed on Aug. 6, 2004, now Pat. No. 7,458,585.

(30) Foreign Application Priority Data

Aug. 8, 2003 (JP) .................................. 2003-206809
Aug. 2, 2004 (JP) .................................. 2004-225411

(51) Int. Cl.
*C10M 107/02* (2006.01)
*C10M 129/72* (2006.01)
*C10M 105/14* (2006.01)

(52) U.S. Cl.
USPC ............ 508/109; 508/110; 508/463; 508/583

(58) Field of Classification Search
USPC .................. 508/463, 109, 110, 583
See application file for complete search history.

(56) References Cited

U.S. PATENT DOCUMENTS

| 1,461 A | 12/1839 | Day |
|---|---|---|
| 2,189,788 A | 2/1940 | Freeman |
| 2,716,972 A | 9/1955 | Paul et al. |
| 2,982,733 A | 5/1961 | Wright et al. |
| 3,211,647 A | 10/1965 | Rosemary et al. |
| 3,790,315 A | 2/1974 | Emanuelss et al. |
| 3,846,162 A | 11/1974 | Bloom |
| 3,932,228 A | 1/1976 | Sugiyama et al. |

(Continued)

FOREIGN PATENT DOCUMENTS

| CA | 2009582 | 8/1990 |
|---|---|---|
| DE | 6 43 034 | 3/1937 |

(Continued)

OTHER PUBLICATIONS

Kida et al., "Tribological Characteristics of DLC films in Rolling Frictions", Japanese Tribology Congress 2000, Proceedings, 2000, A37, pp. 73-74 with English abstract.

(Continued)

*Primary Examiner* — Jim Goloboy
(74) *Attorney, Agent, or Firm* — Foley & Lardner LLP

(57) ABSTRACT

There is provided a sliding member including a base body and a hard carbon coating formed on the base body to define a sliding surface for sliding contact with an opposing member under lubrication according to one embodiment of the present invention. The hard carbon coating has an outermost surface portion lower in hydrogen content than a remaining portion thereof, or an outermost coating layer lower in hydrogen content than at least one other coating layer.

1 Claim, 2 Drawing Sheets

(56) References Cited

U.S. PATENT DOCUMENTS

| | | |
|---|---|---|
| 4,031,023 A | 6/1977 | Musser et al. |
| 4,367,130 A | 1/1983 | Lemelson |
| 4,385,880 A | 5/1983 | Lemelson |
| 4,538,929 A | 9/1985 | Ehrentraut et al. |
| 4,554,208 A | 11/1985 | MacIver et al. |
| 4,645,610 A | 2/1987 | Born et al. |
| 4,702,808 A | 10/1987 | Lemelson |
| 4,712,982 A | 12/1987 | Inagaki et al. |
| 4,755,237 A | 7/1988 | Lemelson |
| 4,755,426 A | 7/1988 | Kokai et al. |
| 4,783,368 A | 11/1988 | Yamamoto et al. |
| 4,834,400 A | 5/1989 | Lebeck |
| 4,842,755 A | 6/1989 | Dunn |
| 4,859,493 A | 8/1989 | Lemelson |
| 4,874,596 A | 10/1989 | Lemelson |
| 4,919,974 A | 4/1990 | McCune et al. |
| 4,933,058 A | 6/1990 | Bache et al. |
| 4,943,345 A | 7/1990 | Asmussen et al. |
| 4,960,643 A | 10/1990 | Lemelson |
| 4,974,498 A | 12/1990 | Lemelson |
| 4,980,021 A | 12/1990 | Kitamura et al. |
| 4,980,610 A | 12/1990 | Varga |
| 4,981,717 A | 1/1991 | Thaler |
| 4,988,421 A | 1/1991 | Drawl et al. |
| 4,992,082 A | 2/1991 | Drawl et al. |
| 5,000,541 A | 3/1991 | DiMarcello et al. |
| 5,021,628 A | 6/1991 | Lemelson |
| 5,032,243 A | 7/1991 | Bache et al. |
| 5,036,211 A | 7/1991 | Scott |
| 5,040,501 A | 8/1991 | Lemelson |
| 5,067,826 A | 11/1991 | Lemelson |
| 5,077,990 A | 1/1992 | Plath |
| 5,078,848 A | 1/1992 | Anttila et al. |
| 5,087,608 A | 2/1992 | Chan et al. |
| 5,096,352 A | 3/1992 | Lemelson |
| 5,110,435 A | 5/1992 | Haberland |
| 5,112,025 A | 5/1992 | Nakayama et al. |
| 5,127,314 A | 7/1992 | Swain |
| 5,131,941 A | 7/1992 | Lemelson |
| 5,132,587 A | 7/1992 | Lemelson |
| 5,142,785 A | 9/1992 | Grewal et al. |
| 5,143,634 A | 9/1992 | Quinga et al. |
| 5,148,780 A | 9/1992 | Urano et al. |
| 5,187,021 A | 2/1993 | Vydra et al. |
| 5,190,807 A | 3/1993 | Kimock et al. |
| 5,190,824 A | 3/1993 | Itoh |
| 5,202,156 A | 4/1993 | Yamamoto et al. |
| 5,205,188 A | 4/1993 | Repenning et al. |
| 5,205,305 A | 4/1993 | Yamakita |
| H1210 H | 7/1993 | Jansen |
| 5,232,568 A | 8/1993 | Parent et al. |
| 5,237,967 A | 8/1993 | Willermet et al. |
| 5,249,554 A | 10/1993 | Tamor et al. |
| 5,255,783 A | 10/1993 | Goodman et al. |
| 5,255,929 A | 10/1993 | Lemelson |
| 5,282,990 A | 2/1994 | Yoneto et al. |
| 5,284,394 A | 2/1994 | Lemelson |
| 5,288,556 A | 2/1994 | Lemelson |
| 5,295,305 A | 3/1994 | Hahn et al. |
| 5,299,937 A | 4/1994 | Gow |
| 5,317,938 A | 6/1994 | De Juan, Jr. et al. |
| 5,326,488 A | 7/1994 | Minokami et al. |
| 5,332,348 A | 7/1994 | Lemelson |
| 5,334,306 A | 8/1994 | Dautremont-Smith et al. |
| 5,349,265 A | 9/1994 | Lemelson |
| 5,358,402 A | 10/1994 | Reed et al. |
| 5,359,170 A | 10/1994 | Chen et al. |
| 5,360,227 A | 11/1994 | Lemelson |
| 5,380,196 A | 1/1995 | Kelly et al. |
| 5,401,543 A | 3/1995 | O'Neill et al. |
| H1461 H | 7/1995 | DiVita et al. |
| 5,432,539 A | 7/1995 | Anderson |
| 5,433,977 A | 7/1995 | Sarin et al. |
| H1471 H | 8/1995 | Braun et al. |
| 5,443,032 A | 8/1995 | Vichr et al. |
| 5,447,208 A | 9/1995 | Lund et al. |
| 5,456,406 A | 10/1995 | Lemelson |
| 5,458,754 A | 10/1995 | Sathrum et al. |
| 5,461,648 A | 10/1995 | Nauflett et al. |
| 5,462,772 A | 10/1995 | Lemelson |
| 5,464,667 A | 11/1995 | Kohler et al. |
| 5,466,431 A | 11/1995 | Dorfman et al. |
| 5,479,069 A | 12/1995 | Winsor |
| 5,482,602 A | 1/1996 | Cooper et al. |
| 5,491,028 A | 2/1996 | Sarin et al. |
| 5,497,550 A | 3/1996 | Trotta et al. |
| 5,509,841 A | 4/1996 | Winsor |
| 5,516,729 A | 5/1996 | Dawson et al. |
| 5,529,815 A | 6/1996 | Lemelson |
| 5,531,878 A | 7/1996 | Vadgama et al. |
| 5,541,566 A | 7/1996 | Deeney |
| 5,547,716 A | 8/1996 | Thaler |
| 5,548,973 A * | 8/1996 | Komine et al. ............... 62/469 |
| 5,551,959 A | 9/1996 | Martin et al. |
| 5,552,675 A | 9/1996 | Lemelson |
| 5,568,391 A | 10/1996 | McKee |
| 5,593,719 A | 1/1997 | Dearnaley et al. |
| 5,616,372 A | 4/1997 | Conley et al. |
| 5,619,889 A | 4/1997 | Jones et al. |
| 5,628,881 A | 5/1997 | Lemelson |
| 5,630,275 A | 5/1997 | Wexler |
| 5,630,953 A | 5/1997 | Klink |
| 5,653,300 A | 8/1997 | Lund et al. |
| 5,669,144 A | 9/1997 | Hahn et al. |
| 5,672,054 A | 9/1997 | Cooper et al. |
| 5,688,557 A | 11/1997 | Lemelson et al. |
| 5,698,272 A | 12/1997 | Smentkowski et al. |
| 5,707,409 A | 1/1998 | Martin et al. |
| 5,714,202 A | 2/1998 | Lemelson et al. |
| 5,719,109 A | 2/1998 | Tokashiki et al. |
| 5,723,207 A | 3/1998 | Lettington et al. |
| 5,731,046 A | 3/1998 | Mistry et al. |
| 5,735,769 A | 4/1998 | Takemura et al. |
| 5,740,941 A | 4/1998 | Lemelson |
| 5,775,817 A | 7/1998 | Gottemoller et al. |
| 5,786,038 A | 7/1998 | Conley et al. |
| 5,790,146 A | 8/1998 | Anderson |
| 5,793,390 A | 8/1998 | Claflin et al. |
| 5,794,801 A | 8/1998 | Lemelson |
| 5,799,549 A | 9/1998 | Decker et al. |
| 5,806,557 A | 9/1998 | Helge |
| 5,824,387 A | 10/1998 | Boutaghou et al. |
| 5,834,708 A | 11/1998 | Svetal et al. |
| 5,840,662 A | 11/1998 | Nibert et al. |
| 5,843,571 A | 12/1998 | Sho |
| 5,851,962 A | 12/1998 | Kaga |
| 5,866,195 A | 2/1999 | Lemelson |
| 5,871,805 A | 2/1999 | Lemelson |
| 5,881,444 A | 3/1999 | Schaefer et al. |
| 5,901,021 A | 5/1999 | Hirano et al. |
| 5,910,940 A | 6/1999 | Guerra |
| 5,927,897 A | 7/1999 | Attar |
| 5,937,812 A | 8/1999 | Reedy et al. |
| 5,940,975 A | 8/1999 | Decker et al. |
| 5,945,214 A | 8/1999 | Ma et al. |
| 5,947,710 A | 9/1999 | Cooper et al. |
| 5,952,102 A | 9/1999 | Cutler |
| 5,958,261 A | 9/1999 | Offer et al. |
| 5,960,762 A | 10/1999 | Imai |
| 5,967,250 A | 10/1999 | Lund et al. |
| 5,968,596 A | 10/1999 | Ma et al. |
| 5,975,686 A | 11/1999 | Hauck et al. |
| 5,976,707 A | 11/1999 | Grab |
| 5,992,268 A | 11/1999 | Decker et al. |
| 5,993,938 A | 11/1999 | Tsukuda et al. |
| 6,006,415 A | 12/1999 | Schaefer et al. |
| 6,015,597 A | 1/2000 | David |
| 6,016,000 A | 1/2000 | Moslehi |
| 6,023,979 A | 2/2000 | Bills et al. |
| 6,028,393 A | 2/2000 | Izu et al. |
| 6,051,298 A | 4/2000 | Ko et al. |
| 6,054,211 A * | 4/2000 | Fukuchi ............... 428/336 |
| 6,056,443 A | 5/2000 | Koike et al. |
| 6,059,460 A | 5/2000 | Ono et al. |

(56) References Cited

U.S. PATENT DOCUMENTS

| | | | |
|---|---|---|---|
| 6,059,830 A | 5/2000 | Lippincott, III et al. |
| 6,071,103 A | 6/2000 | Hirano et al. |
| 6,071,597 A | 6/2000 | Yang et al. |
| 6,083,313 A | 7/2000 | Venkatraman et al. |
| 6,083,570 A | 7/2000 | Lemelson et al. |
| 6,095,690 A | 8/2000 | Niegel et al. |
| 6,099,541 A | 8/2000 | Klopotek |
| 6,099,976 A | 8/2000 | Lemelson et al. |
| 6,106,919 A | 8/2000 | Lee et al. |
| 6,124,198 A | 9/2000 | Moslehi |
| 6,132,875 A | 10/2000 | Kiuchi et al. |
| 6,139,964 A | 10/2000 | Sathrum et al. |
| 6,142,481 A | 11/2000 | Iwashita et al. |
| 6,145,608 A | 11/2000 | Lund et al. |
| 6,156,439 A | 12/2000 | Coffinberry |
| 6,159,558 A | 12/2000 | Wolfe et al. |
| 6,160,683 A | 12/2000 | Boutaghou |
| 6,165,616 A | 12/2000 | Lemelson et al. |
| 6,170,156 B1 | 1/2001 | Lev et al. |
| 6,171,343 B1 | 1/2001 | Dearnaley et al. |
| 6,173,913 B1 | 1/2001 | Shafer et al. |
| 6,190,514 B1 | 2/2001 | Ma et al. |
| 6,193,906 B1 | 2/2001 | Kaneko et al. |
| 6,197,120 B1 | 3/2001 | David |
| 6,197,428 B1 | 3/2001 | Rogers |
| 6,203,651 B1 | 3/2001 | Jarvenkylae et al. |
| 6,205,291 B1 | 3/2001 | Hughes et al. |
| 6,207,625 B1 | 3/2001 | Ogano et al. |
| 6,227,056 B1 | 5/2001 | Bills et al. |
| 6,237,441 B1 | 5/2001 | Nishioka et al. |
| 6,237,852 B1 | 5/2001 | Svetal et al. |
| 6,238,839 B1 | 5/2001 | Tomita et al. |
| 6,255,262 B1 | 7/2001 | Keenan et al. |
| 6,261,424 B1 | 7/2001 | Goncharenko et al. |
| 6,273,793 B1 | 8/2001 | Liners et al. |
| 6,274,220 B1 | 8/2001 | Tsukuda et al. |
| 6,289,593 B1 | 9/2001 | Decker et al. |
| 6,293,648 B1 | 9/2001 | Anderson |
| 6,296,552 B1 | 10/2001 | Boutaghou et al. |
| 6,299,425 B1 * | 10/2001 | Hirano et al. ............... 418/63 |
| 6,305,416 B1 | 10/2001 | Snel et al. |
| 6,309,283 B1 | 10/2001 | Liners et al. |
| 6,311,524 B1 | 11/2001 | Brennan, III et al. |
| 6,316,734 B1 | 11/2001 | Yang |
| 6,322,431 B1 | 11/2001 | Schaenzer et al. |
| 6,322,719 B2 | 11/2001 | Kaneko et al. |
| 6,324,060 B1 | 11/2001 | Hsu |
| 6,325,385 B1 | 12/2001 | Iwashita et al. |
| 6,329,328 B1 | 12/2001 | Koganei et al. |
| 6,333,298 B1 | 12/2001 | Waddoups et al. |
| 6,338,881 B1 | 1/2002 | Sellschopp et al. |
| 6,340,245 B1 | 1/2002 | Horton et al. |
| 6,358,123 B1 | 3/2002 | Liners et al. |
| 6,367,705 B1 | 4/2002 | Lee et al. |
| 6,368,676 B1 | 4/2002 | Gaudreau et al. |
| 6,377,422 B1 | 4/2002 | Boutaghou et al. |
| 6,379,383 B1 | 4/2002 | Palmaz et al. |
| 6,385,987 B2 | 5/2002 | Schlom et al. |
| 6,386,468 B1 | 5/2002 | Neuberger et al. |
| 6,399,215 B1 | 6/2002 | Zhu et al. |
| 6,401,058 B1 | 6/2002 | Akalin et al. |
| 6,439,845 B1 | 8/2002 | Veres |
| 6,439,986 B1 | 8/2002 | Myoung et al. |
| 6,452,752 B1 | 9/2002 | Boutaghou |
| 6,468,642 B1 | 10/2002 | Bray et al. |
| 6,471,979 B2 | 10/2002 | New et al. |
| 6,494,881 B1 | 12/2002 | Bales et al. |
| 6,523,456 B1 | 2/2003 | Kobayashi et al. |
| 6,524,212 B2 | 2/2003 | Ushijima et al. |
| 6,534,141 B1 | 3/2003 | Hull, Jr. et al. |
| 6,537,310 B1 | 3/2003 | Palmaz et al. |
| 6,537,429 B2 | 3/2003 | O'Donnell et al. |
| 6,543,394 B2 | 4/2003 | Tinney |
| 6,544,308 B2 | 4/2003 | Griffin et al. |
| 6,553,957 B1 | 4/2003 | Ishikawa et al. |
| 6,557,968 B2 | 5/2003 | Lee et al. |
| 6,562,445 B2 | 5/2003 | Iwamura |
| 6,562,462 B2 | 5/2003 | Griffin et al. |
| 6,570,172 B2 | 5/2003 | Kim et al. |
| 6,572,651 B1 | 6/2003 | De Scheerder et al. |
| 6,572,935 B1 | 6/2003 | He et al. |
| 6,572,937 B2 | 6/2003 | Hakovirta et al. |
| 6,585,064 B2 | 7/2003 | Griffin et al. |
| 6,586,069 B2 | 7/2003 | Dykes et al. |
| 6,589,640 B2 | 7/2003 | Griffin et al. |
| 6,592,519 B1 | 7/2003 | Martinez |
| 6,592,985 B2 | 7/2003 | Griffin et al. |
| 6,601,662 B2 | 8/2003 | Matthias et al. |
| 6,626,949 B1 | 9/2003 | Townley |
| 6,629,906 B1 | 10/2003 | Chiba et al. |
| 6,637,528 B2 | 10/2003 | Nishiyama et al. |
| 6,638,569 B2 | 10/2003 | McLaughlin et al. |
| 6,645,354 B1 | 11/2003 | Gorokhovsky |
| 6,656,329 B1 | 12/2003 | Ma et al. |
| 6,658,941 B1 | 12/2003 | Bills et al. |
| 6,666,013 B2 | 12/2003 | Nakagawa et al. |
| 6,666,328 B2 | 12/2003 | Sykora |
| 6,666,671 B1 | 12/2003 | Olver et al. |
| 6,684,513 B1 | 2/2004 | Clipstone et al. |
| 6,684,759 B1 | 2/2004 | Gorokhovsky |
| 6,695,865 B2 | 2/2004 | Boyle et al. |
| 6,699,106 B2 | 3/2004 | Myoung et al. |
| 6,701,627 B2 | 3/2004 | Korb et al. |
| 6,715,693 B1 | 4/2004 | Dam et al. |
| 6,726,993 B2 | 4/2004 | Teer et al. |
| 6,729,350 B2 | 5/2004 | Schick |
| 6,729,527 B2 | 5/2004 | Sonnenreich et al. |
| 6,733,513 B2 | 5/2004 | Boyle et al. |
| 6,739,214 B2 | 5/2004 | Griffin et al. |
| 6,739,238 B2 | 5/2004 | Ushijima et al. |
| 6,740,393 B1 | 5/2004 | Massler et al. |
| 6,745,742 B2 | 6/2004 | Meyer |
| 6,749,033 B2 | 6/2004 | Griffin et al. |
| 6,753,042 B1 | 6/2004 | Bakounine et al. |
| 6,753,635 B2 | 6/2004 | Kuhlmann-Wilsdorf |
| 6,761,532 B2 | 7/2004 | Capone et al. |
| 6,761,736 B1 | 7/2004 | Woo et al. |
| 6,780,177 B2 | 8/2004 | Shafirstein et al. |
| 6,797,326 B2 | 9/2004 | Griffin et al. |
| 6,799,468 B2 | 10/2004 | Borenstein |
| 6,806,242 B2 * | 10/2004 | Shirahama et al. .......... 508/291 |
| 6,818,029 B2 | 11/2004 | Myoung et al. |
| 6,820,676 B2 | 11/2004 | Palmaz et al. |
| 6,821,189 B1 | 11/2004 | Coad et al. |
| 6,821,624 B2 | 11/2004 | Utsumi et al. |
| 6,822,788 B2 | 11/2004 | Blitstein |
| 6,844,068 B1 | 1/2005 | Miyake et al. |
| 6,849,085 B2 | 2/2005 | Marton |
| 6,855,237 B2 | 2/2005 | Kolpakov et al. |
| 6,855,791 B2 | 2/2005 | Van Doren et al. |
| 6,861,098 B2 | 3/2005 | Griffin et al. |
| 6,861,137 B2 | 3/2005 | Griffin et al. |
| 6,865,952 B2 | 3/2005 | Bills et al. |
| 6,866,894 B2 | 3/2005 | Trankiem et al. |
| 6,871,700 B2 | 3/2005 | Gorokhovsky |
| 6,872,203 B2 | 3/2005 | Shafirstein et al. |
| 6,875,492 B1 | 4/2005 | Pirzada et al. |
| 6,878,447 B2 | 4/2005 | Griffin et al. |
| 6,880,469 B2 | 4/2005 | Frost |
| 6,882,094 B2 | 4/2005 | Dimitrijevic et al. |
| 6,883,476 B1 | 4/2005 | Nohara et al. |
| 6,886,521 B2 | 5/2005 | Hamada et al. |
| 6,887,585 B2 | 5/2005 | Herbst-Dederichs |
| 6,890,700 B2 | 5/2005 | Tomita et al. |
| 6,893,720 B1 | 5/2005 | Nakahigashi et al. |
| 6,969,198 B2 | 11/2005 | Konishi et al. |
| 7,063,207 B2 | 6/2006 | Sykora |
| 7,086,362 B2 | 8/2006 | Mabuchi et al. |
| 7,228,786 B2 | 6/2007 | Hamada et al. |
| 2001/0036800 A1 | 11/2001 | Liners et al. |
| 2002/0026899 A1 | 3/2002 | McLaughlin et al. |
| 2002/0031987 A1 | 3/2002 | Liners et al. |
| 2002/0034631 A1 | 3/2002 | Griffin et al. |
| 2002/0034632 A1 | 3/2002 | Griffin et al. |

(56) References Cited

U.S. PATENT DOCUMENTS

| | | |
|---|---|---|
| 2002/0051286 A1 | 5/2002 | Blitstein |
| 2002/0068654 A1 | 6/2002 | Baumann et al. |
| 2002/0070357 A1 | 6/2002 | Kim et al. |
| 2002/0074168 A1 | 6/2002 | Matthias et al. |
| 2002/0089571 A1 | 7/2002 | Lee et al. |
| 2002/0090155 A1 | 7/2002 | Ushijima et al. |
| 2002/0090578 A1 | 7/2002 | Schaefera et al. |
| 2002/0130219 A1 | 9/2002 | Parseghian et al. |
| 2002/0148430 A1 | 10/2002 | Kano et al. |
| 2002/0155015 A1 | 10/2002 | Esumi et al. |
| 2002/0175476 A1 | 11/2002 | Chinou et al. |
| 2003/0012234 A1 | 1/2003 | Watson et al. |
| 2003/0019111 A1 | 1/2003 | Korb et al. |
| 2003/0019332 A1 | 1/2003 | Korb et al. |
| 2003/0021995 A1 | 1/2003 | Griffin et al. |
| 2003/0034182 A1 | 2/2003 | Griffin et al. |
| 2003/0035957 A1 | 2/2003 | Griffin et al. |
| 2003/0035958 A1 | 2/2003 | Griffin et al. |
| 2003/0036341 A1 | 2/2003 | Myoung et al. |
| 2003/0037640 A1 | 2/2003 | Griffin et al. |
| 2003/0054171 A1 | 3/2003 | Fukui et al. |
| 2003/0069632 A1 | 4/2003 | De Scheerder et al. |
| 2003/0108777 A1 | 6/2003 | Gunsel et al. |
| 2003/0114094 A1 | 6/2003 | Myoung et al. |
| 2003/0128903 A1 | 7/2003 | Yasuda et al. |
| 2003/0159919 A1 | 8/2003 | Fairbairn et al. |
| 2003/0162672 A1 * | 8/2003 | Shirahama et al. ........... 508/291 |
| 2003/0168323 A1 | 9/2003 | Frost |
| 2003/0177752 A1 | 9/2003 | Nakagawa et al. |
| 2003/0180565 A1 | 9/2003 | Herbst-Dederichs |
| 2003/0199741 A1 | 10/2003 | Martinez |
| 2003/0234371 A1 | 12/2003 | Ziegler |
| 2003/0235691 A1 | 12/2003 | Griffin et al. |
| 2004/0003638 A1 | 1/2004 | Schaefer et al. |
| 2004/0008406 A1 | 1/2004 | Blitstein |
| 2004/0010068 A1 | 1/2004 | Doren et al. |
| 2004/0011900 A1 | 1/2004 | Gebhardt et al. |
| 2004/0027018 A1 | 2/2004 | LeBlanc et al. |
| 2004/0028949 A1 * | 2/2004 | Ono et al. ............. 428/694 TS |
| 2004/0035375 A1 | 2/2004 | Gibisch et al. |
| 2004/0074467 A1 | 4/2004 | Hamada et al. |
| 2004/0092405 A1 | 5/2004 | Konishi et al. |
| 2004/0105806 A1 | 6/2004 | Griffin et al. |
| 2004/0109621 A1 | 6/2004 | Frost |
| 2004/0115435 A1 | 6/2004 | Griffin et al. |
| 2004/0116242 A1 | 6/2004 | Uchiyama et al. |
| 2004/0133301 A1 | 7/2004 | Van Doren et al. |
| 2004/0154570 A1 | 8/2004 | Mabuchi et al. |
| 2004/0168326 A1 | 9/2004 | Korb et al. |
| 2004/0184687 A1 | 9/2004 | Morales et al. |
| 2004/0223256 A1 | 11/2004 | Feng et al. |
| 2004/0234770 A1 | 11/2004 | Mori et al. |
| 2004/0241448 A1 | 12/2004 | Kano et al. |
| 2004/0242435 A1 | 12/2004 | Nishimura et al. |
| 2004/0244539 A1 | 12/2004 | Korb et al. |
| 2004/0261614 A1 | 12/2004 | Hamada et al. |
| 2005/0001201 A1 | 1/2005 | Bocko et al. |
| 2005/0005892 A1 | 1/2005 | Nishimura et al. |
| 2005/0025975 A1 | 2/2005 | Okamoto et al. |
| 2005/0035222 A1 | 2/2005 | Hamada et al. |
| 2005/0037879 A1 | 2/2005 | Murata et al. |
| 2005/0056241 A1 | 3/2005 | Nomura et al. |
| 2005/0061291 A1 | 3/2005 | Nishimura et al. |
| 2005/0061636 A1 | 3/2005 | Frost et al. |
| 2005/0064196 A1 | 3/2005 | Martin et al. |
| 2005/0082139 A1 | 4/2005 | Ishikawa et al. |
| 2005/0084390 A1 | 4/2005 | Ueno et al. |
| 2005/0089685 A1 | 4/2005 | Hamada et al. |
| 2005/0098134 A1 | 5/2005 | Nishimura et al. |
| 2005/0100701 A1 | 5/2005 | Hamada et al. |
| 2005/0115744 A1 | 6/2005 | Griffin et al. |
| 2005/0118426 A1 | 6/2005 | Miyake et al. |
| 2005/0188942 A1 | 9/2005 | Hamada et al. |
| 2006/0093839 A1 | 5/2006 | Okamoto et al. |
| 2006/0207540 A1 | 9/2006 | Matsui et al. |
| 2006/0263604 A1 | 11/2006 | Martin et al. |
| 2007/0060483 A1 | 3/2007 | Konishi et al. |

FOREIGN PATENT DOCUMENTS

| | | |
|---|---|---|
| DE | 195 07 086 A1 | 9/1996 |
| DE | 197 04 224 A1 | 8/1997 |
| DE | 198 25 860 A1 | 12/1999 |
| DE | 100 17 459 A1 | 10/2000 |
| DE | 100 61 397 A1 | 5/2002 |
| DE | 101 58 683 A1 | 6/2003 |
| DE | 103 18 135 A1 | 11/2003 |
| DE | 103 37 559 A1 | 3/2005 |
| EP | 0 286 996 A3 | 10/1988 |
| EP | 0 299 785 A2 | 1/1989 |
| EP | 0 308 143 A1 | 3/1989 |
| EP | 0 333 416 A1 | 9/1989 |
| EP | 0 384 772 A1 | 8/1990 |
| EP | 0 388 800 A2 | 9/1990 |
| EP | 0 392 125 A1 | 10/1990 |
| EP | 0 398 985 B1 | 11/1990 |
| EP | 0 407 977 A1 | 1/1991 |
| EP | 0 435 312 A1 | 7/1991 |
| EP | 0 291 006 B1 | 1/1992 |
| EP | 0 474 369 A1 | 3/1992 |
| EP | 0 500 253 A1 | 8/1992 |
| EP | 0 511 153 A1 | 10/1992 |
| EP | 0 529 327 A1 | 3/1993 |
| EP | 0 546 824 A1 | 6/1993 |
| EP | 0 573 943 A1 | 12/1993 |
| EP | 0 619 504 A1 | 10/1994 |
| EP | 0 621 136 A2 | 10/1994 |
| EP | 0 624 353 A3 | 11/1994 |
| EP | 0 624 354 A3 | 11/1994 |
| EP | 0 378 378 B1 | 1/1995 |
| EP | 0 651 069 A1 | 5/1995 |
| EP | 0 656 458 A3 | 6/1995 |
| EP | 0 661 470 A2 | 7/1995 |
| EP | 0 652 301 B1 | 10/1995 |
| EP | 0 396 603 B1 | 6/1996 |
| EP | 0 757 615 B1 | 2/1997 |
| EP | 0 759 519 A2 | 2/1997 |
| EP | 0 818 622 A1 | 1/1998 |
| EP | 0 826 790 B1 | 3/1998 |
| EP | 0 842 754 A1 | 5/1998 |
| EP | 0 884 400 A1 | 6/1998 |
| EP | 0 850 133 B1 | 7/1998 |
| EP | 0 816 112 A3 | 10/1998 |
| EP | 0 870 820 A1 | 10/1998 |
| EP | 0 882 759 A1 | 12/1998 |
| EP | 0 647 318 B1 | 3/1999 |
| EP | 0 905 221 A1 | 3/1999 |
| EP | 0 905 419 A2 | 3/1999 |
| EP | 0 731 190 B1 | 5/1999 |
| EP | 0 949 200 A1 | 10/1999 |
| EP | 0 950 123 B1 | 10/1999 |
| EP | 0 845 154 B1 | 11/1999 |
| EP | 0 582 676 B1 | 3/2000 |
| EP | 1 063 085 A1 | 12/2000 |
| EP | 0 850 126 B1 | 1/2001 |
| EP | 1 067 211 A1 | 1/2001 |
| EP | 1 076 087 A1 | 2/2001 |
| EP | 1 078 736 A1 | 2/2001 |
| EP | 1 109 196 A1 | 6/2001 |
| EP | 0 778 902 B1 | 9/2001 |
| EP | 1 154 012 A2 | 11/2001 |
| EP | 1 034 320 B1 | 12/2001 |
| EP | 0 893 677 B1 | 1/2002 |
| EP | 1 183 470 B1 | 3/2002 |
| EP | 1 184 480 A2 | 3/2002 |
| EP | 1 190 791 A3 | 4/2002 |
| EP | 1 219 464 A2 | 7/2002 |
| EP | 1 233 054 A1 | 8/2002 |
| EP | 0 971 812 B1 | 10/2002 |
| EP | 1 018 291 B1 | 10/2002 |
| EP | 1 281 513 A2 | 2/2003 |
| EP | 1 300 608 A2 | 4/2003 |
| EP | 1 498 597 A1 | 7/2003 |

(56) References Cited

FOREIGN PATENT DOCUMENTS

| | | |
|---|---|---|
| EP | 1 340 605 A1 | 9/2003 |
| EP | 1 365 141 A1 | 11/2003 |
| EP | 1 083 946 B1 | 12/2003 |
| EP | 1 078 736 B1 | 1/2004 |
| EP | 1 378 271 A1 | 1/2004 |
| EP | 0 862 395 B1 | 4/2004 |
| EP | 1 411 145 A1 | 4/2004 |
| EP | 1 418 353 A2 | 5/2004 |
| EP | 1 440 775 A1 | 7/2004 |
| EP | 1 445 119 A1 | 8/2004 |
| EP | 1 475 557 A1 | 11/2004 |
| EP | 1 481 699 A1 | 12/2004 |
| EP | 1 482 190 A2 | 12/2004 |
| EP | 1 311 885 B1 | 3/2005 |
| EP | 1 510 594 A2 | 3/2005 |
| EP | 1 512 781 A2 | 3/2005 |
| EP | 1 338 641 B1 | 5/2006 |
| FR | 2669689 A1 | 5/1992 |
| GB | 0 768 226 | 2/1957 |
| GB | 1 005 638 | 9/1965 |
| GB | 2 338 716 A | 12/1999 |
| IE | 990532 A1 | 3/2001 |
| JP | 52-006318 | 1/1977 |
| JP | 62-111106 A | 5/1987 |
| JP | 63-021209 A | 1/1988 |
| JP | 63-288994 A | 11/1988 |
| JP | 01-201819 A | 8/1989 |
| JP | 05-070879 A | 3/1993 |
| JP | 05-036004 U | 5/1993 |
| JP | 05-042616 U | 6/1993 |
| JP | 06-264993 A | 9/1994 |
| JP | 06-294307 A | 10/1994 |
| JP | 07-063135 A | 3/1995 |
| JP | 07-090553 A | 4/1995 |
| JP | 07-103238 A | 4/1995 |
| JP | 07-118832 A | 5/1995 |
| JP | 07-041386 A | 10/1995 |
| JP | 07-286696 A | 10/1995 |
| JP | 08-014014 A | 1/1996 |
| JP | 08-061499 A | 3/1996 |
| JP | 08-128448 A | 5/1996 |
| JP | 09-020981 A | 1/1997 |
| JP | 09-253770 A | 9/1997 |
| JP | 10-025565 A | 1/1998 |
| JP | 10-82390 | 3/1998 |
| JP | 10-088369 A | 4/1998 |
| JP | 10-265790 A | 10/1998 |
| JP | 10-298440 A | 11/1998 |
| JP | 11-022423 A | 1/1999 |
| JP | 11-190406 A | 7/1999 |
| JP | 11-287329 A | 10/1999 |
| JP | 11-292629 A | 10/1999 |
| JP | 11-294118 A | 10/1999 |
| JP | 11-333773 A | 12/1999 |
| JP | 2000-080992 A | 3/2000 |
| JP | 2000-087218 A | 3/2000 |
| JP | 2000-088104 A | 3/2000 |
| JP | 2000-119843 A | 4/2000 |
| JP | 2000-120870 A | 4/2000 |
| JP | 2000-504089 A | 4/2000 |
| JP | 2000-128516 A | 5/2000 |
| JP | 2000-170768 A | 6/2000 |
| JP | 2000-297373 A | 10/2000 |
| JP | 2000-327484 A | 11/2000 |
| JP | 2000-339083 A | 12/2000 |
| JP | 2001-062605 A | 3/2001 |
| JP | 2001-064005 A | 3/2001 |
| JP | 2001-093141 A | 4/2001 |
| JP | 2001-172766 A | 6/2001 |
| JP | 2001-192864 A | 7/2001 |
| JP | 2001-269938 A | 10/2001 |
| JP | 2001-271741 A | 10/2001 |
| JP | 2001-280236 A | 10/2001 |
| JP | 2001-316686 A | 11/2001 |
| JP | 2002-265968 A | 9/2002 |
| JP | 2002-309912 A | 10/2002 |
| JP | 2002-332571 A | 11/2002 |
| JP | 2003-013163 A | 1/2003 |
| JP | 2003-013799 A | 1/2003 |
| JP | 2003-025117 A | 1/2003 |
| JP | 2003-027081 A | 1/2003 |
| JP | 2003-028174 A | 1/2003 |
| JP | 2003-088939 A | 3/2003 |
| JP | 2003-113941 A | 4/2003 |
| JP | 2003-147508 A | 5/2003 |
| JP | 2004-036788 A | 2/2004 |
| JP | 2004-155891 A | 6/2004 |
| JP | 2005-068529 A | 3/2005 |
| RU | 1770350 A1 | 10/1992 |
| RU | 2004586 C1 | 12/1993 |
| RU | 2153782 C1 | 7/2000 |
| WO | WO-89/06338 A1 | 7/1989 |
| WO | WO-89/06707 A1 | 7/1989 |
| WO | WO-89/06708 A1 | 7/1989 |
| WO | WO-92/02602 A1 | 2/1992 |
| WO | WO-92/06843 A1 | 4/1992 |
| WO | WO-92/19425 A2 | 11/1992 |
| WO | WO-93/21288 A1 | 10/1993 |
| WO | WO-93/21289 A1 | 10/1993 |
| WO | WO-93/24828 A1 | 12/1993 |
| WO | WO-95/20253 A2 | 7/1995 |
| WO | WO-95/29044 A1 | 11/1995 |
| WO | WO-95/29273 A1 | 11/1995 |
| WO | WO-95/31584 A1 | 11/1995 |
| WO | WO-96/04485 A1 | 2/1996 |
| WO | WO-96/05333 A1 | 2/1996 |
| WO | WO-96/05942 A1 | 2/1996 |
| WO | WO-96/06961 A1 | 3/1996 |
| WO | WO-96/12389 A1 | 4/1996 |
| WO | WO-96/24488 A1 | 8/1996 |
| WO | WO-96/40446 A1 | 12/1996 |
| WO | WO-97/07531 A1 | 2/1997 |
| WO | WO-97/10093 A1 | 3/1997 |
| WO | WO-97/10940 A1 | 3/1997 |
| WO | WO-97/14555 A1 | 4/1997 |
| WO | WO-97/16138 A1 | 5/1997 |
| WO | WO-98/02715 A1 | 1/1998 |
| WO | WO-98/12994 A1 | 4/1998 |
| WO | WO-98/13528 A1 | 4/1998 |
| WO | WO-98/47141 A1 | 10/1998 |
| WO | WO-99/09547 A1 | 2/1999 |
| WO | WO-99/12404 A1 | 3/1999 |
| WO | WO-99/14512 A1 | 3/1999 |
| WO | WO-99/16371 A1 | 4/1999 |
| WO | WO-99/22694 A2 | 5/1999 |
| WO | WO-99/27157 A1 | 6/1999 |
| WO | WO 99/29477 A1 | 6/1999 |
| WO | WO-99/31557 A1 | 6/1999 |
| WO | WO-99/34385 A1 | 7/1999 |
| WO | WO-99/46847 A1 | 9/1999 |
| WO | WO-99/54520 A1 | 10/1999 |
| WO | WO-99/54934 A1 | 10/1999 |
| WO | WO-99/57743 A1 | 11/1999 |
| WO | WO-99/62077 A1 | 12/1999 |
| WO | WO-99/62572 A1 | 12/1999 |
| WO | WO-00/22613 A1 | 4/2000 |
| WO | WO-00/24554 A1 | 5/2000 |
| WO | WO-00/25410 A1 | 5/2000 |
| WO | WO-00/28142 A1 | 5/2000 |
| WO | WO-00/33051 A1 | 6/2000 |
| WO | WO-00/35000 A1 | 6/2000 |
| WO | WO-00/44032 A1 | 7/2000 |
| WO | WO-00/47402 A1 | 8/2000 |
| WO | WO-00/55385 A1 | 9/2000 |
| WO | WO-00/56127 A1 | 9/2000 |
| WO | WO-00/56393 A1 | 9/2000 |
| WO | WO-00/62327 A2 | 10/2000 |
| WO | WO-00/68451 A2 | 11/2000 |
| WO | WO-00/75517 A1 | 12/2000 |
| WO | WO-00/78504 A1 | 12/2000 |
| WO | WO-01/05917 A1 | 1/2001 |
| WO | WO-01/06033 A1 | 1/2001 |
| WO | WO-01/14736 A1 | 3/2001 |
| WO | WO-01/14745 A1 | 3/2001 |

(56) References Cited

FOREIGN PATENT DOCUMENTS

| | | |
|---|---|---|
| WO | WO-01/26862 A1 | 4/2001 |
| WO | WO-01/37631 A2 | 5/2001 |
| WO | WO-01/40537 A1 | 6/2001 |
| WO | WO-01/47451 A1 | 7/2001 |
| WO | WO-01/59544 A2 | 8/2001 |
| WO | WO-01/61182 A1 | 8/2001 |
| WO | WO-01/61719 A1 | 8/2001 |
| WO | WO-01/62372 A1 | 8/2001 |
| WO | WO-01/63639 A1 | 8/2001 |
| WO | WO-01/67834 A1 | 9/2001 |
| WO | WO-01/79583 A2 | 10/2001 |
| WO | WO-01/80224 A2 | 10/2001 |
| WO | WO-02/06875 A1 | 1/2002 |
| WO | WO-02/13188 A1 | 2/2002 |
| WO | WO-02/24601 A1 | 3/2002 |
| WO | WO-02/24603 A1 | 3/2002 |
| WO | WO-02/24970 A2 | 3/2002 |
| WO | WO-02/32625 A2 | 4/2002 |
| WO | WO-02/44440 A1 | 6/2002 |
| WO | WO-02/054454 A2 | 7/2002 |
| WO | WO-02/062714 A2 | 8/2002 |
| WO | WO-02/073021 A2 | 9/2002 |
| WO | WO-02/080996 A1 | 10/2002 |
| WO | WO-02/085237 A2 | 10/2002 |
| WO | WO-02/090461 A1 | 11/2002 |
| WO | WO-02/097289 A1 | 12/2002 |
| WO | WO-03/009978 A1 | 2/2003 |
| WO | WO-03/013990 A1 | 2/2003 |
| WO | WO-03/020329 A1 | 3/2003 |
| WO | WO-03/021731 A1 | 3/2003 |
| WO | WO-03/029685 A1 | 4/2003 |
| WO | WO-03/031543 A2 | 4/2003 |
| WO | WO-03/046508 A3 | 6/2003 |
| WO | WO-03/054876 A1 | 7/2003 |
| WO | WO-03/076309 A2 | 9/2003 |
| WO | WO-03/078679 A1 | 9/2003 |
| WO | WO-03/091758 A2 | 11/2003 |
| WO | WO-03/095009 A1 | 11/2003 |
| WO | WO-03/105134 A1 | 12/2003 |
| WO | WO-2004/001804 A2 | 12/2003 |
| WO | WO-2004/004998 A1 | 1/2004 |
| WO | WO-2004/019809 A2 | 3/2004 |
| WO | WO-2004/024206 A1 | 3/2004 |
| WO | WO-2004/026359 A1 | 4/2004 |
| WO | WO-2004/026500 A1 | 4/2004 |
| WO | WO-2004/036169 A1 | 4/2004 |
| WO | WO-2004/036292 A2 | 4/2004 |
| WO | WO-2004/038701 A2 | 5/2004 |
| WO | WO-2004/043631 A1 | 5/2004 |
| WO | WO-2004/048126 A2 | 6/2004 |
| WO | WO-2004/067466 A1 | 8/2004 |
| WO | WO-2004/068530 A1 | 8/2004 |
| WO | WO-2004/071670 A1 | 8/2004 |
| WO | WO-2004/072959 A2 | 8/2004 |
| WO | WO-2004/078424 A2 | 9/2004 |
| WO | WO-2004/084773 A1 | 10/2004 |
| WO | WO-2004/088113 A1 | 10/2004 |
| WO | WO-2005/010596 A2 | 2/2005 |
| WO | WO-2005/011744 A2 | 2/2005 |
| WO | WO-2005/014760 A1 | 2/2005 |
| WO | WO-2005/014761 A2 | 2/2005 |
| WO | WO-2005/014763 A1 | 2/2005 |
| WO | WO-2005/014882 A1 | 2/2005 |
| WO | WO-2005/016620 A2 | 2/2005 |
| WO | WO-2005/021851 A1 | 3/2005 |
| WO | WO-2005/025844 A1 | 3/2005 |
| WO | WO-2005/034791 A1 | 4/2005 |
| WO | WO-2005/037144 A2 | 4/2005 |
| WO | WO-2005/037985 A2 | 4/2005 |
| WO | WO-2005/040451 A1 | 5/2005 |
| WO | WO-2005/042064 A1 | 5/2005 |
| WO | WO-2005/047737 A1 | 5/2005 |
| WO | WO-2006/075219 A2 | 7/2006 |
| WO | WO-2007/088649 A1 | 8/2007 |

OTHER PUBLICATIONS

Mori et al., "Seizure resistance of DLC-Si Films Formed by Plasma CVD Method", 109$^{th}$ Annual Meeting of the Surface Finishing Society, Proceedings, 2004, pp. 287-288 with English abstract.
U.S. Appl. No. 09/545,181, filed Apr. 7, 2000, Miyake et al.
U.S. Appl. No. 10/468,713, filed Aug. 22, 2003, Mabuchi et al.
U.S. Appl. No. 10/911,741, filed May 5, 2004, Ueno.
"Aluminium Alloy Die Castings," Japanese Industrial Standard (JIS H 5302), 2000, pp. 1-12.
"Aluminium Alloy Die Castings," JIS H5302, (2000), pp. 1670-1681.
"Aluminium Alloys Castings", Japanese Industrial Standard (JIS H 5202), 1999 (pp. 1637-1646).
"Assessment of 2nd to 5th Order Irregularities of Surface Configuration by Means of Sections of Surfaces Definitions Relating to Reference System and Dimensions," DIN 4762, UDC 621-288:001.4 (Aug. 1960), pp. 1-4.
Ajayi, O., et al., "Effect of Carbon Coating on Scuffing Performance in Diesel Fuels," Tribology Transactions, vol. 44, 2001, pp. 298-304.
D.G. Watson et al., "Engineering Drawing Practice," XP002281300, University of Hertfordshire, Sep. 1991, p. 29, Figure 38.
Dr. Marx, "Surfaces and Contact Mechanics", XP-002233233, Google, Retrieved from the Internet, Mar. 3, 2003, pp. 1-18.
E. Mayer-Rässler, "Neuartige Laufflächen-Schutzverfahren für Kolben von Verbrennungsmotoren", VDI-Zeitschrift Bd., Apr. 18, 1942, vol. 86, No. 15-16, pp. 245-247.
Engine Oil Viscosity Classification—SAE J300 revised Apr. 1997, p. 133.
Fujimori, N., et al., "Characterization of Conducting Diamond Films," Vacuum, vol. 36, Nos. 1-3, 1996, pp. 99-102.
Gåhlin, Rickard et al., "ME-C:H Coatings in Motor Vehicles," WEAR 249, 2001, pp. 302-309.
Hershberger, J, et al., "Friction and Wear Behavior of Near-Frictionless Carbon Coatings in Formulated Gasolines," Surface & Coating Technology, 183, 2004, pp. 111-117.
Hershberger, J., et al., "Evaluation of DLC Coatings for Spark-Ignited, Direct-Injected Fuel Systems," Surface & Coatings Technology, 179, 2004, pp. 237-244.
International Standard "Application of Carbides for Machining by Chip Removal—Designation of the Main Groups of Chip Removal and Groups of Application," ISO 513, (1975), pp. 67-69.
International Standard, "Petroleum products—Determination of base number—Perchloric acid potentiometric titration method", ISO 3771, second edition Aug. 15, 1994, pp. 1-8.
Japanese Industrial Standard "Aluminium Alloy Castings," JIS H5202, (1999), pp. 1-17.
Japanese Industrial Standard Handbook, "Machine Elements", 2003, pp. 262-286 and 2586.
Japanese Industrial Standard, "Chromium Molybdenum Steels", JIS G 4105, 1978, pp. 1-11.
Japanese Industrial Standard, "Geometrical Product Specificatons (GPS)—Surface texture: Profile method—Terms, Definitions and surface texture parameters," No. B 0601 (2001), pp. 1-35.
Meyer-Rässler, "Neuartige Laufflachen-Schutzverfahren für Kolben von Verbrennungsmotoren," VDI-Zeitschrift, 1942, vol. 86, No. 15/16, pp. 245 to 247.
"Carbon Steels for Machine Structural Use", Japanese Industrial Standard (JIS G 4051), 1979, pp. 1-10.
"Chromium Molybdenum Steels," Japanese Industrial Standard (JIS G 4105), 1979, pp. 1-11.
"Chromium Steels", Japanese Industrial Standard (JIS G 4104), 1979, pp. 1-9.
"Geometrical Product Specifications (GPS)—Surface texture: Profile method—Terms, definitions and surface texture parameters", Japanese Industrial Standard (JIS B 0601) Machine Elements, 2003, pp. 6, 7, 263-287, and 2586.
"Geometrical Product Specifications (GPS)—Surface Texture: Profile Method—Terms, Definitions and Surface Texture Parameters," International Standard, ISO 4287, TC 213 (1997), pp. 1-25.
"Grey iron castings", Japanese Industrial Standard (JIS G 5501), pp. 2075-2077.

(56) References Cited

OTHER PUBLICATIONS

"Stainless Steel Bars", Japanese Industrial Standard (JIS G 4303), pp. 1457-1477.

"Standard Practice for Codification of Certain Nonferrous Metals and Alloys, Cast and Wrought1", ASTM International, Designation: B 275-02, Jun. 2002, pp. 1-7.

"Standard Test Method for Calibration and Operation of the Falex Block-on-Ring Friction and Wear Testing Machine", ASTM Designation: D2714-88, Jan. 1989, pp. 383-386.

"Standard Test Method for Separation of Representative Aromatics and Nonaromatics Fractions of High-Boiling Oils by Elution Chromatography", ASTM Standards, Designation: D 2549-91 (Reapproved 1995), pp. 895-900.

Ajayi, O., et al., "Effect of Carbon Coating on Scuffing Performance in Diesel Fuels," Tribology Transactions, vol. 44, 2001, pp. 298-304.

Ajayi, O., et al., Effect of Thin-Film Coating on Wear in EGR-Contaminated Oil, Energy Technology Div., Argonne National Laboratory, Jun. 3, 2002.

API Motor Oil Guide, Which Oil is Right for You, American Petroleum Institute, Copyright 2002.

Japanese Industrial Standard, "Geometrical Product Specificatons (GPS)—Surface texture: Profile method—Terms, Definitions and surface texture parameters," No. B 0601 (2001), pgs. 1-35.

Japanese Industrial Standard, "High Carbon Chromium Bearing Steels", JIS G 4805, 1999, pp. 1-31.

Japanese Industrial Standard, "Structural Steels with Specified Hardenability Bands", JIS G 4052, 1979, pp. 2414, 2415, 1390-1403, 1410 and 1411.

JIS Handbook, Machine Elements, "Geometrical Product Specifications (GPS)—Surface texture: Profile method—Terms, definitions and surface texture parameters", JIS B 0601, 2003, pp. 6, 7, 262-287 and 2586.

JIS Japanese Industrial Standard; "Surface Roughness—Definitions and Designation"; JIS B 0601; 1994. (w/Translation).

JIS Japanese Industrial Standard; "Vickers Hardness Test—Test Method"; JIS Z 2244; 1998; (w/Translation).

K. Holmberg et al., "Tribological Characteristics of Diamond-like Carbon Coatings," VTT Symposium, Technical Research Centre of Finland, XP000570636, 1994, pp. 24-238.

Kano et al., "Friction Characteristics of a Hard Carbon Film in Engine Oil, (No. 2) (Surface Analysis Result of Sliding Surface)," Japan Tribology Congress 1999, 5, pp. 11-12.

Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Kano et al., Japan Tribology Congress 1999, Proceeding pp. 11-12.

Kovalchenko, A., et al., "Friction and Wear Performance of Low-Friction Carbon Coatings Under Oil Lubrication, " Energy Technology Div., Argonne National Laboratory, Jun. 3, 2002.

M. Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Meyer-Rässler, "Neuartige Laufflächen-Schutzverfahren für Kolben von Verbrennungsmotoren," VDI-Zeitschrift, 1942, vol. 86, No. 15/16, pp. 245 to 247.

Patent/Literature Search Report, Bawa Biotechnology Consulting, LLC, Jun. 3, 2005 (201 pages).

Ronkainen, Helena, "Tribological Properties of Hydrogenated and Hydrogen-Free Diamond-Like Carbon Coatings," Dissertion for the Degree of Doctor of Science in Technology, VTT Publications No. 434, Jun. 15, 2001.

Steve J. Bull et al., "High-Performance Diamond and Diamond-like Coatings", JOM, Apr. 1995, pp. 16-19, vol. 47, No. 4, XP 000500980.

* cited by examiner

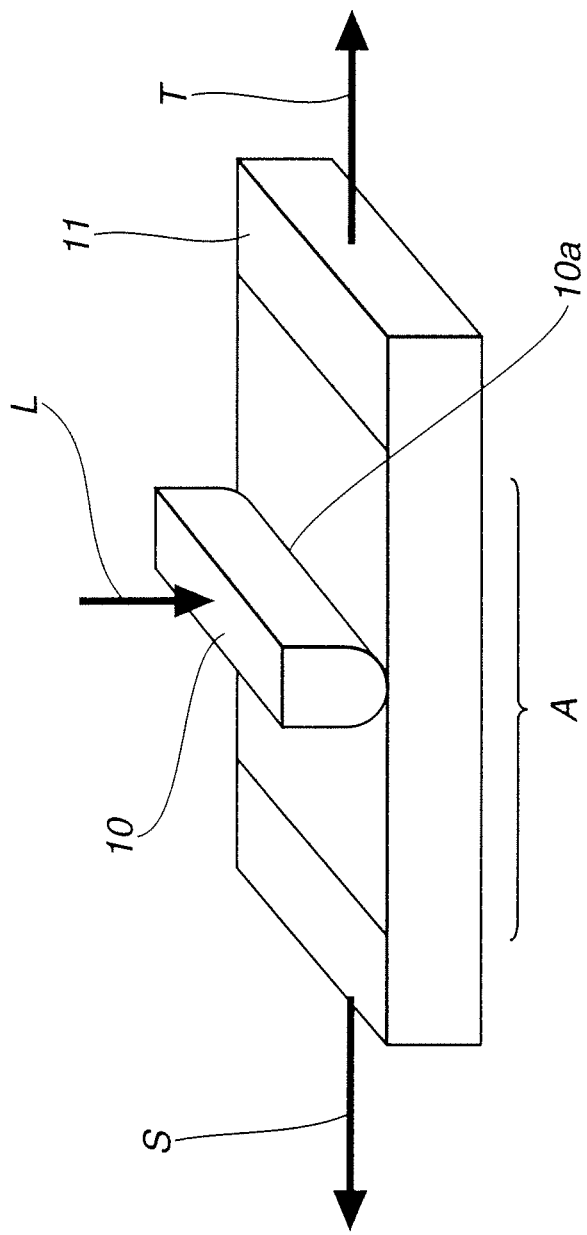

SLIDING MEMBER AND PRODUCTION PROCESS THEREOF

CROSS-REFERENCE TO RELATED APPLICATIONS

The present application is a Divisional of U.S. application Ser. No. 10/912,541, filed Aug. 6, 2004, which is based upon and claims the benefit of priority from the prior Japanese Patent Application Nos. 2003-206809 filed on Aug. 8, 2003 and 2004-225411 filed on Aug. 2, 2004, the entire contents of which are incorporated herein by reference. The present application is also related to the following applications: U.S. patent application Ser. No. 09/545,181 (based on Japanese Patent Application Hei-11-102205 filed on Apr. 9, 1999); U.S. patent application Ser. No. 10/468,713, which is the national phase of PCT Application No. JP02/10057 (based on Japanese Patent Application 2001-117680 filed on Apr. 17, 2001); U.S. patent application Ser. No. 10/355,099 (based on Japanese Patent Application 2002-45576 filed on Feb. 22, 2002); U.S. patent application Ser. No. 10/682,559 (based on Japanese Patent Application No. 2002-302205 filed on Oct. 16, 2002); and U.S. patent application Ser. No. 10/692,853 (based on Japanese Patent Application 2002-322322 filed on Oct. 16, 2002).

BACKGROUND OF THE INVENTION

The invention relates to a sliding member, and more particularly to a sliding member having a thin coating of hard carbon, such as diamond-like carbon, to show excellent low-friction characteristics and durability in the presence of a specific lubricant. The invention also relates to a process for producing the sliding member.

Global environmental problems, such as global warming and ozone layer destruction, are coming to the fore. The global warming is significantly affected by $CO_2$ emission, and the setting of $CO_2$ emission standards to reduce $CO_2$ emission has become a big concern to each country. In order to reduce $CO_2$ emission, it is important to improve vehicle fuel efficiency. The reduction of friction in a vehicle engine is thus desired to obtain a direct improvement in fuel efficiency.

There are some conceivable ways to reduce the engine friction. One way to reduce the engine friction is to provide engine sliding members with lower friction coefficients and higher wear resistance under extreme friction/wear conditions. For example, it is proposed to apply hard carbon coating materials to the cam follower portions of engine sliding members (such as a valve lifter and a lifter shim) and to use a so-called roller rocker arm equipped with a roller needle bearing. As it has been proved that a diamond-like carbon (DLC) coating shows a lower friction coefficient in the air than those of titanium nitride (TiN) film and chromium nitride (CrN) film, the DLC coating is expected to be useful for the engine sliding members. Another way to reduce the engine friction is to improve the properties of a lubricating oil applied to the sliding members. It is proposed to lower lubricating oil viscosity so as to reduce viscous resistance in hydrodynamic lubrication regions and agitation resistance in mechanical sliding portions. It is also proposed to provide a lubricating oil blended with a suitable friction modifier and other additives so as to reduce engine friction losses under mixed lubrication conditions and boundary lubrication conditions. Many studies have been made on various friction modifiers including organomolybdenum compounds e.g. molybdenum dithiocarbamate (MoDTC) and molybdenum dithiophosphate (MoDTP), and the lubricating oil containing such an organomolybdenum friction modifier is proved to be effective in reducing the friction between steel sliding members in the early stages of use.

The low-friction characteristics of the DLC coating and the friction modifying properties of the organomolybdenum compound are reported in Japan Tribology Congress 1999. 5, Tokyo, Proceeding Page 11-12, KANO et al. and World Tribology Congress 2001. 9, Vienna, Proceeding Page 342, KANO et al.

SUMMARY OF THE INVENTION

The DLC coating however cannot always show a low friction coefficient in the presence of a lubricating oil. Even in the presence of a lubricating oil containing an organomolybdenum friction modifier, the DLC coating does not show its low friction coefficient properly.

Further, the adhesion of the DLC coating to a base material is susceptible to improvement when the DLC coating is low in hydrogen content. When the DLC coating has no hydrogen content, it is hard to increase coating thickness. The durability of the DLC coating is then susceptible to improvement.

It is therefore an object of the present invention to provide a sliding member having a thin coating of hard carbon to show excellent low-friction characteristics and durability in the presence of a lubricant, so as to obtain a further improvement in fuel efficiency when used in a vehicle engine. It is also an object of the present invention to provide a process for producing the sliding member.

As a result of extensive researches, it is found by the present inventors that a thin coating of hard carbon having a certain structure shows excellent low-friction characteristics and durability by combination with a specific lubricant. The present invention has been accomplished based on the above finding.

According to a first aspect of the invention, there is provided a sliding member, comprising: a base body; and a hard carbon coating formed on the base body to define a sliding surface for sliding contact with an opposing member under lubrication, the hard carbon coating having an outermost surface portion lower in hydrogen content than a remaining portion thereof.

According to a second aspect of the invention, there is provided a sliding member, comprising: a base body; and a hard carbon coating formed on the base body to define a sliding surface for sliding contact with an opposing member under lubrication, the hard carbon coating having two or more coating layers laminated together in a thickness direction thereof, the laminated coating layers including an outermost coating layer lower in hydrogen content than at least one other coating layer.

According to a third aspect of the invention, there is provided a process for producing a sliding member, comprising: providing a base body of the sliding member; and forming a hard carbon coating on the base body in such a manner that the hard carbon coating has an outermost surface portion lower in hydrogen content than a remaining portion thereof.

According to a fourth aspect of the invention, there is provided a process for producing a sliding member, comprising: providing a base body of the sliding member; and forming, on the base body, a hard carbon coating in such a manner that the hard carbon coating an outermost coating layer lower in hydrogen content than at least one other coating layer.

The other objects and features of the invention will also become understood from the following description.

BRIEF DESCRIPTION OF THE DRAWINGS

FIG. 2 is a schematic view of a reciprocating friction/wear test unit.

DESCRIPTION OF THE EMBODIMENTS

The present invention will be described below in detail. In the following description, all percentages (%) are by mass unless otherwise specified.

A sliding member according to one exemplary embodiment of the present invention (hereinafter just referred to as a "sliding member") has a base body, a thin coating of hard carbon formed on the base body to define a sliding surface for sliding contact with an opposing member, and a film of lubricant applied to the sliding surface so that the sliding member slides on the opposing member with the lubricant film interposed between the sliding member and the opposing member.

Figure 1B:
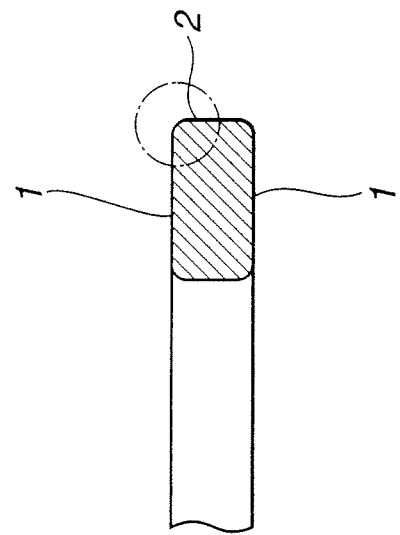
FIG. 1B is a partial section view of the piston ring of FIG. 1A.
Figure 1C:
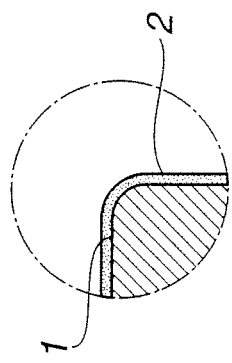
FIG. 1C is an enlarged view of the encircled portion of FIG. 1B.
Figure 1A:
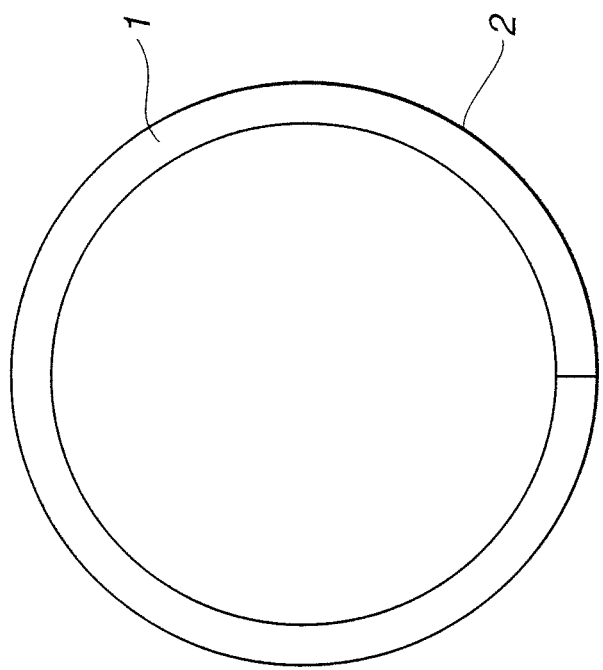
FIG. 1A is a plan view of a piston ring according to one exemplary embodiment of the present invention.

Although the sliding member has a multitude of uses, it is desirable to use the sliding member under extreme friction/wear conditions so as to make the most of excellent low-friction characteristics and durability of the sliding member. For example, the sliding member can be formed into a piston ring, such as a top ring and/or an oil ring, for an automotive engine, as shown in FIGS. 1A, 1B and 1C. The hard carbon coating is preferably formed on the opposite ring faces 1 of the base body of the piston ring, which come into contact with the piston-ring groove of a piston (as the opposing member, not shown in the drawings), so as to not only reduce the friction between the piston and the piston ring effectively but also improve the seizure resistance of the piston. Also, the hard carbon coating is preferably formed on the outer circumferential face 2 of the body portion of the piston ring, which comes into sliding contact with the cylinder bore of an engine block (as the opposing member, not shown in the drawings), so as to reduce the friction between the piston ring and the cylinder wall effectively. It is alternatively possible to cover the whole of the piston ring with the hard carbon coating and possible to form a hard carbon coating on the cylinder wall.

Sliding Member

The base body is formed of any known base material, such as an iron-based (steel) material or aluminum-based (aluminum alloy) material, and may be given surface treatment before being covered with the hard carbon coating.

The hard carbon coating is generally made of amorphous carbon in which carbon elements exist in both $sp^2$ and $sp^3$ hybridizations to form a composite structure of graphite and diamond. Specific examples of the amorphous carbon include hydrogen-free amorphous carbon (a-C), hydrogen-containing amorphous carbon (a-C:H) and/or metal carbide or metal containing diamond-like carbon (DLC) that contains as a part a metal element of titanium (Ti) or molybdenum (Mo). The hydrogen-free amorphous carbon and the amorphous carbon low in hydrogen content are also called "diamond-like carbon (DLC)".

According to a first embodiment of the present invention, the hard carbon coating has an outermost surface portion lower in hydrogen content than a remaining portion thereof. With such a hydrogen content distribution, it is possible to improve the adhesion of the hard carbon coating to the base body and possible to increase the thickness of the hard carbon coating to a sufficient degree, thereby securing or improving the low-friction characteristics, wear resistance and durability of the sliding member. Herein, the "outermost surface portion" of the hard carbon coating is defined as a portion below the sliding surface, for example, extending within a range of 5% of the coating thickness, or extending within a range of 1.0 μm in thickness.

In order to obtain a larger friction reducing effect, it is desirable to minimize the hydrogen content of the outermost surface portion of the hard carbon coating in the first embodiment. The average hydrogen content of the outermost surface portion of the hard carbon coating is preferably controlled to 20 atomic % or less, more preferably 10 atomic % or less, still more preferably 5 atomic % or less, yet more preferably 0.5 atomic % or less, and most preferably substantially zero.

The hydrogen content distribution of the hard carbon coating is not particularly restricted in the first embodiment so long as the outermost surface portion of the hard carbon coating is lower in hydrogen content than the remaining portion. In view of the procedures and conditions of the coating process and the production cost, the hydrogen content distribution of the hard carbon coating can be varied appropriately in accordance with the low-friction characteristics, wear resistance and durability desired of the hard carbon coating. It is however desirable that the hydrogen content of the hard carbon coating gradually decreases in a coating thickness direction from a base body side to a sliding surface side (i.e. an outermost coating surface side). When the hard carbon coating is formed of such a functionally gradient material having a continuous hydrogen content gradient, the internal stress of the hard carbon coating becomes relieved. This makes it possible to prevent the occurrence of cracking in the hard carbon coating and to thereby further improve the durability of the hard carbon coating. Alternatively, the hydrogen content of the hard carbon coating may become decreased in a stepwise manner.

According to a second embodiment of the present embodiment, the hard carbon coating has two or more layers laminated together in a coating thickness direction and including an outermost layer lower in hydrogen content than at least one other layer. Preferably, the outermost layer of the hard carbon coating is made lower in hydrogen content than any other layer or layers. With such a layer structure, it is also possible to improve the adhesion of the hard carbon coating to the base body and possible to increase the thickness of the hard carbon coating to a sufficient degree, thereby securing or improving the low-friction characteristics, wear resistance and durability of the sliding member. Herein, the "layer" of the hard carbon coating is defined as a portion having a substantially uniform hydrogen content throughout its thickness.

The layer structure of the hard carbon coating is not particularly restricted in the second embodiment so long as the outermost coating layer is lower in hydrogen content than any other coating layer. In view of the procedures and conditions of the coating process and the production cost, the layer structure of the hard carbon coating can be determined appropriately in accordance with the low-friction characteristics, wear resistance and durability desired of the hard carbon coating. It is however desirable that the hydrogen content of the hard carbon coating gradually decreases layer by layer from a base body side to a sliding surface side. Alternatively, the hydrogen content of the hard carbon coating may become decreased in a stepwise manner.

It is also desirable to minimize the hydrogen content of the outermost layer of the hard carbon coating in the second embodiment, in order to obtain a larger friction reducing effect. The hydrogen content of the outermost layer of the hard carbon coating is preferably controlled to 20 atomic % or less, more preferably 10 atomic % or less, still more preferably 5 atomic % or less, yet more preferably 0.5 atomic % or less, and most preferably substantially zero.

In each of the first and second embodiments, the hard carbon coating can be formed by a physical vapor deposition (PVD) process, a chemical vapor deposition (CVD) process or a combination thereof. To lower the hydrogen content of the outermost surface portion or outermost layer of the hard carbon coating, it is effective to reduce the amount of hydrogen in a coating atmosphere while forming the hard carbon coating by e.g. a PVD arc ion plating process.

Further, the base body may preferably be given undercoating by either a chromium plating process, a chromium nitride process, a nitriding process or a combination thereof before being covered with the hard carbon coating, so as to increase the adhesion of the hard carbon coating to the base body for improvement in durability.

Lubricant

Either of the following lubricating oil and lubricating agent is desirably used as the lubricant.

The lubricating oil is predominantly composed of a base oil, and preferably contains therein at least one of an ashless fatty-ester friction modifier, an ashless aliphatic-amine friction modifier, polybutenyl succinimide, a derivative of polybutenyl succinimide and zinc dithiophosphate. Especially, the lubricating oil containing either or both of the ashless fatty-ester friction modifier and the ashless aliphatic-friction modifier produces a greater friction reducing effect on the sliding friction between the sliding member covered with the hard carbon film according to the present embodiment and the opposing member made of iron- or aluminum-based material.

The base oil is not particularly limited, and can be selected from any commonly used base oil compounds, such as mineral oils, synthetic oils and fats.

Specific examples of the mineral oils include normal paraffin oils and paraffin-based or naphthene-based oils prepared by extracting lubricating oil fractions from petroleum by atmospheric or reduced-pressure distillation, and then, purifying the obtained lubricating oil fractions with any of the following treatments: solvent deasphalting, solvent extraction, hydrocracking, solvent dewaxing, hydro-refining, wax isomerization, sulfuric acid treatment and clay refining. Although the lubricating oil fraction is generally purified by hydro- or solvent-refining, it is preferable to use the mineral oil prepared by purifying the lubricating oil fraction through the deep hydrocracking or the GTL (Gas-to-Liquid) wax isomerization process for reduction of an aromatics content in the oil.

Specific examples of the synthetic oils include: poly-α-olefins (PAO), such as 1-octene oligomer, 1-decene oligomer and ethylene-propylene oligomer, and hydrogenated products thereof; isobutene oligomer and a hydrogenated product thereof; isoparaffins; alkylbenzenes; alkylnaphthalenes; diesters, such as ditridecyl glutarate, dioctyl adipate, diisodecyl adipate, ditridecyl adipate and dioctyl sebacate; polyol esters, such as trimethylolpropane esters (e.g. trimethylolpropane caprylate, trimethylolpropane pelargonate and trimethylolpropane isostearate) and pentaerythritol esters (e.g. pentaerythritol-2-ethyl hexanoate and pentaerythritol pelargonate); polyoxyalkylene glycols; dialkyl diphenyl ethers; and polyphenyl ethers. Among these synthetic oil compounds, preferred are poly-α-olefins, such as 1-octene oligomer and 1-decene oligomer, and hydrogenated products thereof.

The above-mentioned base oil compounds can be used alone or in combination thereof. In the case of using as the base oil a mixture of two or more of the base oil compounds, there is no particular limitation to the mixing ratio of the base oil compounds.

The sulfur content of the base oil is not particularly restricted, and is preferably 0.2% or less, more preferably 0.1% or less, still more preferably 0.05% or lower, based on the total mass of the base oil. It is desirable to use the hydro-refined mineral oil or the synthetic oil because the hydro-refined mineral oil and the synthetic oil each have a sulfur content of not more than 0.005% or substantially no sulfur content (not more than 5 ppm).

The aromatics content of the base oil is not also particularly restricted. Herein, the aromatics content is defined as the amount of an aromatics fraction determined according to ASTM D2549. In order for the lubricating oil to maintain low-friction characteristics suitably for use in an internal combustion engine over an extended time period, the aromatics content of the base oil is preferably 15% or less, more preferably 10% or less, and still more preferably 5% or less, based on the total mass of the base oil. The lubricating oil undesirably deteriorates in oxidation stability when the aromatics content of the base oil exceeds 15%.

The kinematic viscosity of the base oil is not particularly restricted. To use the lubricating oil in an internal combustion engine, the kinematic viscosity of the base oil is preferably 2 $mm^2/s$ or higher, more preferably 3 $mm^2/s$ or higher, and, at the same time, is preferably 20 $mm^2/s$ or lower, more preferably 10 $mm^2/s$ or lower, still more preferably 8 $mm^2/s$ or lower, as measured at 100° C. When the kinematic viscosity of the base oil is less than 2 $mm^2/s$ at 100° C., there is a possibility that the lubricating oil fails to provide sufficient wear resistance and causes a considerable evaporation loss. When the kinematic viscosity of the base oil exceeds 20 $mm^2/s$ at 100° C., there is a possibility that the lubricating oil fails to provide low-friction characteristics and deteriorates in low-temperature performance. In the case of using two or more of the base oil compounds in combination, it is not necessary to limit the kinematic viscosity of each base oil compound to within such a specific range so for as the kinematic viscosity of the mixture of the base oil compounds at 100° C. is in the above-specified range.

The viscosity index of the base oil is not particularly restricted, and is preferably 80 or higher, more preferably 100 or higher, most preferably 120 or higher, to use the lubricating oil in an internal combustion engine. When the base oil has a higher viscosity index, the lubricating oil can attain improved oil-consumption performance as well as low-temperature viscosity properties.

As the fatty-ester friction modifier and the aliphatic-amine friction modifier, there may be used fatty acid esters and aliphatic amines each having $C_6$-$C_{30}$ straight or branched hydrocarbon chains, preferably $C_8$-$C_{24}$ straight or branched hydrocarbon chains, more preferably $C_{10}$-$C_{20}$ straight or branched hydrocarbon chains. When the carbon number of the hydrocarbon chain of the friction modifier is not within the range of 6 to 30, there arises a possibility of failing to produce a desired friction reducing effect. Specific examples of the $C_6$-$C_{30}$ straight or branched hydrocarbon chains of the fatty-ester and aliphatic-amine friction modifiers include: alkyl groups, such as hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl, tetracosyl, pentacosyl, hexacosyl, heptacosyl, octacosyl, nonacosyl and triacontyl; and alkenyl groups, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, heneicosenyl, docosenyl, tricosenyl, tetracosenyl, pentacosenyl, hexacosenyl, heptacosenyl, octacosenyl, nonacosenyl and triacontenyl. The above alkyl and alkenyl groups include all possible isomers.

The fatty acid esters are preferably exemplified by esters of fatty acids having the above $C_6$-$C_{30}$ hydrocarbon groups and monohydric or polyhydric aliphatic alcohols. Specific examples of such fatty acid esters include glycerol monooleate, glycerol dioleate, sorbitan monooleate and sorbitan dioleate.

The aliphatic amines are preferably exemplified by aliphatic monoamines and alkylene oxide adducts thereof, aliphatic polyamines, imidazolines and derivatives thereof each having the above $C_6$-$C_{30}$ hydrocarbon groups. Specific examples of such aliphatic amines include: aliphatic amine compounds, such as laurylamine, lauryldiethylamine, lauryldiethanolamine, dodecyldipropanolamine, palmitylamine, stearylamine, stearyltetraethylenepentamine, oleylamine, oleylpropylenediamine, oleyldiethanolamine and N-hydroxyethyloleylimidazolyne; alkylene oxide adducts of the above aliphatic amine compounds, such as N,N-dipolyoxyalkylene-N-alkyl or alkenyl ($C_6$-$C_{28}$) amines; and acid-modified compounds prepared by reacting the above aliphatic amine compounds with $C_2$-$C_{30}$ monocarboxylic acids (such as fatty acids) or $C_2$-$C_{30}$ polycarboxylic acids (such as oxalic acid, phthalic acid, trimellitic acid and pyromellitic acid) so as to neutralize or amidate the whole or part of the remaining amino and/or imino groups. Above all, N,N-dipolyoxyethylene-N-oleylamine is preferably used.

The amount of the fatty-ester friction modifier and/or the aliphatic-amine friction modifier contained in the lubricating oil is not particularly restricted, and is preferably 0.05 to 3.0%, more preferably 0.1 to 2.0%, and most preferably 0.5 to 1.4%, based on the total mass of the lubricating oil. When the amount of the fatty-ester friction modifier and/or the aliphatic-amine friction modifier in the lubricating oil is less than 0.05%, there is a possibility of failing to obtain a sufficient friction reducing effect. When the amount of the fatty-ester friction modifier and/or the aliphatic-amine friction modifier in the lubricating oil exceeds 3.0%, there is a possibility that the solubility of the friction modifier or modifiers in the base oil becomes so low that the lubricating oil deteriorates in storage stability to cause precipitations.

As the polybutenyl succinimide, there may be used compounds represented by the following general formulas (1) and (2).

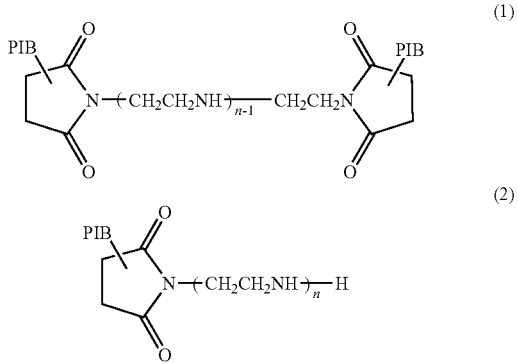

In the formulas (1) and (2), PIB represents a polybutenyl group derived from polybutene having a number-average molecular weight of 900 to 3500, preferably 1000 to 2000, that can be prepared by polymerizing high-purity isobutene or a mixture of 1-butene and isobutene in the presence of a boron fluoride catalyst or aluminum chloride catalyst. When the number-average molecular weight of the polybutene is less than 900, there is a possibility of failing to provide a sufficient detergent effect. When the number-average molecular weight of the polybutene exceeds 3500, the polybutenyl succinimide tends to deteriorate in low-temperature fluidity. The polybutene may be purified, before being used for the production of the polybutenyl succinimide, by removing trace amounts of fluorine and chlorine residues resulting from the polybutene production catalyst with any suitable treatment (such as adsorption process or washing process) in such a manner as to control the amount of the fluorine and chlorine residues in the polybutene to 50 ppm or less, desirably 10 ppm or less, more desirably 1 ppm or less.

Further, n represents an integer of 1 to 5, preferably 2 to 4, in the formulas (1) and (2) in view of the detergent effect.

The production method of the polybutenyl succinimide is not particularly restricted. For example, the polybutenyl succinimide can be prepared by reacting a chloride of the polybutene, or the polybutene from which fluorine and chlorine residues are sufficiently removed, with maleic anhydride at 100 to 200° C. to form polybutenyl succinate, and then, reacting the polybutenyl succinate with polyamine (such as diethylene triamine, triethylene tetramine, tetraethylene pentamine or pentaethylene hexamine).

As the polybutenyl succinimide derivative, there may be used boron- or acid-modified compounds obtained by reacting the polybutenyl succinimides of the formula (1) or (2) with boron compounds or oxygen-containing organic compounds so as to neutralize or amidate the whole or part of the remaining amino and/or imide groups. Among others, boron-containing polybutenyl succinimides, especially boron-containing bis(polybutenyl)succinimide, are preferably used. The content ratio of nitrogen to boron (B/N) by mass in the boron-containing polybutenyl succinimide compound is usually 0.1 to 3, preferably 0.2 to 1.

The boron compound used for producing the polybutenyl succinimide derivative can be a boric acid, a borate or a boric acid ester. Specific examples of the boric acid include orthoboric acid, metaboric acid and tetraboric acid. Specific examples of the borate include: ammonium salts, such as ammonium borates, e.g., ammonium metaborate, ammonium tetraborate, ammonium pentaborate and ammonium octaborate. Specific examples of the boric acid ester include: esters of boric acids and alkylalcohols (preferably $C_1$-$C_6$ alkylalcohols), such as monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate.

The oxygen-containing organic compound used for producing the polybutenyl succinimide derivative can be any of $C_1$-$C_{30}$ monocarboxylic acids, such as formic acid, acetic acid, glycolic acid, propionic acid, lactic acid, butyric acid, valeric acid, caproic acid, enanthic acid, caprylic acid, pelargonic acid, capric acid, undecylic acid, lauric acid, tridecanoic acid, myristic acid, pentadecanoic acid, palmitic acid, margaric acid, stearic acid, oleic acid, nonadecanoic acid and eicosanoic acid; $C_2$-$C_{30}$ polycarboxylic acids, such as oxalic acid, phthalic acid, trimellitic acid and pyromellitic acid, and anhydrides and esters thereof; $C_2$-$C_6$ alkylene oxides; and hydroxy(poly)oxyalkylene carbonates.

The amount of the polybutenyl succinimide and/or polybutenyl succinimide derivative contained in the lubricating oil is not particularly restricted, and is preferably 0.1 to 15%, more preferably 1.0 to 12%, based on the total mass of the lubricating oil. When the amount of the polybutenyl succineimide and/or polybutenyl succinimide derivative in the lubricating oil is less than 0.1%, there is a possibility of failing to attain a sufficient detergent effect. When the amount of the polybutenyl succineimide and/or polybutenyl succinimide derivative in the lubricating oil exceeds 15%, the lubricating oil may deteriorate in demulsification ability. In addition, it is uneconomical to add such a large amount of the polybutenyl succineimide and/or polybutenyl succinimide derivative in the lubricating oil.

As the zinc dithiophosphate, there may be used compounds represented by the following general formula (3).

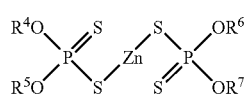

(3)

In the formula (3), $R^4$, $R^5$, $R^6$ and $R^7$ each represent $C_1$-$C_{24}$ hydrocarbon groups. The $C_1$-$C_{24}$ hydrocarbon group is preferably a $C_1$-$C_{24}$ straight- or branched-chain alkyl group, a $C_3$-$C_{24}$ straight- or branched-chain alkenyl group, a $C_5$-$C_{13}$ cycloalkyl or straight- or branched-chain alkylcycloalkyl group, a $C_6$-$C_{18}$ aryl or straight- or branched-chain alkylaryl group or a $C_7$-$C_{19}$ arylalkyl group. The above alkyl group or alkenyl group can be primary, secondary or tertiary. Specific examples of $R^4$, $R^5$, $R^6$ and $R^7$ include: alkyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl and tetracosyl; alkenyl groups, such as propenyl, isopropenyl, butenyl, butadienyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl (oleyl), nonadecenyl, icosenyl, heneicosenyl, docosenyl, tricosenyl and tetracosenyl; cycloalkyl groups, such as cyclopentyl, cyclohexyl and cycloheptyl; alkylcycloalkyl groups, such as methylcyclopentyl, dimethylcyclopentyl, ethylcyclopentyl, propylcyclopentyl, ethylmethylcyclopentyl, trimethylcyclopentyl, diethylcyclopentyl, ethyldimethylcyclopentyl, propylmethylcyclopentyl, propylethylcyclopentyl, di-propylcyclopentyl, propylethylmethylcyclopentyl, methylcyclohexyl, dimethylcyclohexyl, ethylcyclohexyl, propylcyclohexyl, ethylmethylcyclohexyl, trimethylcyclohexyl, diethylcyclohexyl, ethyldimethylcyclohexyl, propylmethylcyclohexyl, propylethylcyclohexyl, di-propylcyclohexyl, propylethylmethylcyclohexyl, methylcycloheptyl, dimethylcycloheptyl, ethylcycloheptyl, propylcycloheptyl, ethylmethylcycloheptyl, trimethylcycloheptyl, diethylcycloheptyl, ethyldimethylcycloheptyl, propylmethylcycloheptyl, propylethylcycloheptyl, di-propylcycloheptyl and propylethylmethylcycloheptyl; aryl groups, such as phenyl and naphthyl; alkylaryl groups, such as tolyl, xylyl, ethylphenyl, propylphenyl, ethylmethylphenyl, trimethylphenyl, butylphenyl, propylmethylphenyl, diethylphenyl, ethyldimethylphenyl, tetramethylphenyl, pentylphenyl, hexylphenyl, heptylphenyl, octylphenyl, nonylphenyl, decylphenyl, undecylphenyl and dodecylphenyl; and arylalkyl groups, such as benzyl, methylbenzyl, dimethylbenzyl, phenethyl, methylphenethyl and dimethylphenethyl. The above hydrocarbon groups include all possible isomers. Above all, preferred are $C_1$-$C_{18}$ straight- or branched-chain alkyl group and $C_6$-$C_{18}$ aryl or straight- or branched-chain alkylaryl group.

The zinc dithiophosphate compounds are preferably exemplified by zinc diisopropyldithiophosphate, zinc diisobutyldithiophosphate, zinc di-sec-butyldithiophosphate, zinc di-sec-pentyldithiophosphate, zinc di-n-hexyldithiophosphate, zinc di-sec-hexyldithiophosphate, zinc di-octyldithiophosphate, zinc di-2-ethylhexyldithiophosphate, zinc di-n-decyldithiophosphate zinc di-n-dodecyldithiophosphate, and zinc diisotridecyldithiophosphate.

The amount of the zinc dithiophosphate contained in the lubricating oil is not particularly restricted. In order to obtain a larger friction reducing effect, the zinc dithiophosphate is preferably contained in an amount of 0.1% or less, more preferably in an amount of 0.06% or less, most preferably in a minimum effective amount, in terms of the phosphorus element based on the total mass of the lubricating oil. When the amount of the zinc dithiophosphate in the lubricating oil exceeds 0.1%, there is a possibility of inhibiting the friction reducing effect of the ashless fatty-ester friction modifier and/or the ashless aliphatic-amine friction modifier, particularly on the sliding friction between the DLC-coated sliding member and the iron-based opposing member.

The production method of the zinc dithiophosphate is not particularly restricted, and the zinc dithiophosphate can be prepared by any known method. For example, the zinc dithiophosphate may be prepared by reacting alcohols or phenols having the above $R^4$, $R^5$, $R^6$ and $R^7$ hydrocarbon groups with phosphorous pentasulfide ($P_2O_5$) to form dithiophosphoric acid, and then, neutralizing the dithiophosphoric acid with zinc oxide. It is noted that the molecular structure of zinc dithiophosphate differs according to the alcohols or phenols used as a raw material for the zinc dithiophosphate production.

The above zinc dithiophosphate compounds can be used alone or in the form of a mixture of two or more thereof. In the case of using two or more of the zinc dithiophosphate compounds in combination, there is no particular limitation to the mixing ratio of the zinc dithiophosphate compounds.

In order to improve the properties of the lubricating oil for use in an internal combustion engine, the lubricating oil may further contain any other additive or additives, such as a metallic detergent, an antioxidant, a viscosity index improver, a friction modifier other than the above-mentioned fatty-ester friction modifier and aliphatic-amine friction modifier, an ashless dispersant other than the above-mentioned polybutenyl succinimide and polybutenyl succinimide derivative, an anti-wear agent or extreme-pressure agent, a rust inhibitor, a nonionic surfactant, a demulsifier, a metal deactivator and/or an anti-foaming agent.

The metallic detergent can be selected from any metallic detergent compound commonly used for engine lubricants. Specific examples of the metallic detergent include sulfonates, phenates and salicylates of alkali metals, such as sodium (Na) and potassium (K), or alkali-earth metals, such as calcium (Ca) and magnesium (Mg); and a mixture of two or more thereof. Among others, sodium and calcium sulfonates, sodium and calcium phenates, and sodium and calcium salicylates are suitably used. The total base number and amount of the metallic detergent can be selected in accordance with the properties desired of the lubricating oil. The total base number of the metallic detergent is usually 0 to 500 mgKOH/g, preferably 150 to 400 mgKOH/g, as measured by perchloric acid method according to ISO 3771. The amount of the metallic detergent is usually 0.1 to 10% based on the total mass of the lubricating oil.

The antioxidant can be selected from any antioxidant compounds commonly used for engine lubricants. Specific examples of the antioxidant include: phenolic antioxidants, such as 4,4'-methylenebis(2,6-di-tert-butylphenol) and octadecyl-3-(3,5-di-tert-butyl-4-hydroxyphenyl)propionate; amino antioxidants, such as phenyl-α-naphthylamine, alkylphenyl-α-naphthylamine and alkyldiphenylamine; and mixtures of two or more thereof. The amount of the antioxidant is usually 0.01 to 5% based on the total mass of the lubricating oil.

As the viscosity index improver, there may be used: non-dispersion type polymethacrylate viscosity index improvers, such as copolymers of one or more kinds of methacrylates and hydrogenated products thereof; dispersion type polymethacrylate viscosity index improvers, such as copolymers of methacrylates further including nitrogen compounds; and other viscosity index improvers, such as copolymers of ethylene and α-olefins (e.g. propylene, 1-butene and 1-pentene) and hydrogenated products thereof, polyisobutylenes and hydrogenated products thereof, styrene-diene hydrogenated copolymers, styrene-maleate anhydride copolymers and polyalkylstyrenes. The molecular weight of the viscosity index improver needs to be selected in view of the shear stability. For example, the number-average molecular weight of the viscosity index improver is desirably in a range of 5000 to 1000000, more desirably 100000 to 800000, for the dispersion or non-dispersion type polymethacrylate; in a range of 800 to 5000 for the polyisobutylene or hydrogenated product thereof, and in a range of 800 to 300000, more desirably 10000 to 200000 for the ethylene/α-olefin copolymer or hydrogenated product thereof. The above viscosity index improving compounds can be used alone or in the form of a mixture of two or more thereof. The amount of the viscosity index improver is preferably 0.1 to 40.0% based on the total mass of the lubricating oil.

The friction modifier other than the above-mentioned fatty-ester friction modifier and aliphatic-amine friction modifier can be exemplified by ashless friction modifiers, such as boric acid esters, higher alcohols and aliphatic ethers, and metallic friction modifiers, such as molybdenum dithiophosphate, molybdenum dithiocarbamate and molybdenum disulfide.

The ashless dispersant other than the above-mentioned polybutenyl succinimide and polybutenyl succinimide derivative can be any of polybutenylbenzylamines and polybutenylamines each having polybutenyl groups of which the number-average molecular weight is 900 to 3500, polybutenyl succinimides having polybutenyl groups of which the number-average molecular weight is less than 900, and derivatives thereof.

As the anti-friction agent or extreme-pressure agent, there may be used: disulfides, sulfurized fats, olefin sulfides, phosphate esters having one to three $C_2$-$C_{20}$ hydrocarbon groups, thiophosphate esters, phosphite esters, thiophosphite esters and amine salts of these esters.

As the rust inhibitor, there may be used: alkylbenzene sulfonates, dinonylnaphthalene sulfonates, esters of alkenylsuccinic acids and esters of polyalcohols.

As the nonionic surfactant and demulsifier, there may be used: noionic polyalkylene glycol surfactants, such as polyoxyethylene alkylethers, polyoxyethylene alkylphenylethers and polyoxyethylene alkylnaphthylethers.

The metal deactivator can be exemplified by imidazolines, pyrimidine derivatives, thiazole and benzotriazole.

The anti-foaming agent can be exemplified by silicones, fluorosilicones and fluoroalkylethers.

Each of the friction modifier other than the fatty-ester and aliphatic-amine friction modifiers, the ashless dispersant other than the polybutenyl succinimide and polybutenyl succinimide derivative, the anti-wear agent or extreme-pressure agent, the rust inhibitor and the demulsifier is usually contained in an amount of 0.01 to 5% based on the total mass of the lubricating oil, the metal deactivator is usually contained in an amount of 0.005 to 1% based on the total mass of the lubricating oil, and the anti-foaming agent is usually contained in an amount of 0.0005 to 1% based on the total mass of the lubricating oil.

The lubricating agent is predominantly composed of a compound having a hydroxyl group, which produces a greater friction reducing effect on the sliding friction between the sliding member covered with the hard carbon film according to the present embodiment and the opposing member made of iron- or aluminum-based material. Specific examples of the hydroxyl group containing compound include alcohols. Among various alcohols, either glycerol or ethylene glycol is preferably used as the lubricating agent.

The present invention will be described in more detail by reference to the following examples. However, it should be noted that the following examples are only illustrative and not intended to limit the invention thereto.

Preparations of Test Samples

Example 1

A substantially semicylindrical piece (as a base body) having a dimension of 8×12×40 mm was first cut from S45C steel (according to JIS G4051). A DLC coating (as an inner coating layer) having a hydrogen content of 20 atomic % and a thickness of 10 μm was formed by a CVD process on a semicylindrical face of the cut piece. Another DLC coating (as an outer coating layer) having a hydrogen content of 5 atomic % and a thickness of 0.5 μm was subsequently formed by a PVD arc ion plating process, thereby giving a test specimen. The test specimen was then subjected to the following friction/wear test using poly-α-olefin oil with no additives as a lubricating oil.

Example 2

A substantially semicylindrical piece (as a base body) having a dimension of 8×12×40 mm was first cut from S45C steel (according to JIS G4051). A DLC coating (as an inner coating layer) having a hydrogen content of 20 atomic % and a thickness of 10 μm was formed by a CVD process on a semicylindrical face of the cut piece. Another DLC coating (as an outer coating layer) having a hydrogen content of 0.5 atomic % and a thickness of 0.5 μm was subsequently formed by a PVD arc ion plating process, thereby giving a test specimen. The test specimen was subjected to the friction/wear test using poly-α-olefin oil with no additives as a lubricating oil.

Example 3

A substantially semicylindrical piece (as a base body) having a dimension of 8×12×40 mm was first cut from S45C steel (according to JIS G4051). A DLC coating (as an inner coating layer) having a hydrogen content of 20 atomic % and a thickness of 10 μm was formed by a CVD process on a semicylindrical face of the cut piece. Another DLC coating (as an outer coating layer) having a hydrogen content of 0.5 atomic % and a thickness of 0.5 μm was subsequently formed by a PVD arc ion plating process, thereby giving a test specimen. The test specimen was subjected to the friction/wear test using poly-α-olefin oil blended with 1 mass % glycerol monooleate (as an ashless fatty-ester friction modifier) as a lubricating oil.

Example 4

A substantially semicylindrical piece (as a base body) having a dimension of 8×12×40 mm was first cut from S45C steel (according to JIS G4051). A DLC coating (as an inner coating layer) having a hydrogen content of 20 atomic % and a thickness of 10 μm was formed by a CVD process on a semicylindrical face of the cut piece. Another DLC coating (as an outer coating layer) having a hydrogen content of 0.5 atomic % and a thickness of 0.5 μm was subsequently formed by a PVD arc ion plating process, thereby giving a test specimen. The test specimen was then subjected to the friction/wear test using glycerol as a lubricating agent.

Comparative Example 1

A substantially semicylindrical piece (as a base body) having a dimension of 8×12×40 mm was cut from S45C steel (according to JIS G4051). A coating of chrome plating having a thickness of 50 μm was formed on a semicylindrical face of the cut piece, thereby giving a test specimen. The test specimen was then subjected to the friction/wear test using poly-α-olefin oil with no additives as a lubricating oil.

Comparative Example 2

A substantially semicylindrical piece (as a base body) having a dimension of 8×12×40 mm was cut from S45C steel (according to JIS G4051). A coating of titanium nitride (TiN) having a thickness of 20 μm was formed on a semicylindrical face of the cut piece, thereby giving a test specimen. The test specimen was subjected to the friction/wear test using poly-α-olefin oil with no additives as a lubricating oil.

Comparative Example 3

A substantially semicylindrical piece (as a base body) having a dimension of 8×12×40 mm was cut from S45C steel (according to JIS G4051). A coating of chromium nitride (CrN) having a thickness of 20 μm was formed on a semicylindrical face of the cut piece, thereby giving a test specimen. The test specimen was subjected to the friction/wear test using poly-α-olefin oil with no additives as a lubricating oil.

Comparative Example 4

A substantially semicylindrical piece (as a base body) having a dimension of 8×12×40 mm was cut from S45C steel (according to JIS G4051). A DLC coating having a hydrogen content of 20 atomic % and a thickness of 10 μm was formed by a CVD process on a semicylindrical face of the cut piece, thereby giving a test specimen. The test specimen was then subjected to the friction/wear test using poly-α-olefin oil blended with 1 mass % glycerol monooleate (as an ashless fatty-ester friction modifier) as a lubricating oil.

Evaluation of Performance by Friction/Wear Test

The friction/wear test was conducted under the following conditions using a reciprocating friction/wear tester. In the friction/wear tester, the test specimen (10) of each of Examples 1 to 4 and Comparative Examples 1 to 4 was set as shown in FIG. 2 so as to reciprocate in directions S and T while sliding the semicylindrical portion (10a) of the test specimen (10) on the area A of the plate-shaped opposing specimen (11) under a load L. Herein, the opposing specimen was made of FC250 iron casting (according to JIS G5501). During the test, the coefficient of friction between the test specimen (10) and the opposing specimen (11) was measured at a turning end of the area A. Also, the wear amount of the test specimen (10) was measured after the test. The measurement results are shown in TABLE. In TABLE, the wear amounts of the test specimens of Examples 1, 2 and 4 and Comparative Examples 1 to 4 are indicated with reference to the wear amount (1.0) of the test specimen of Example 3.

| [Test conditions] | |
|---|---|
| Test specimen (10): | A semicylindrical-shaped member formed with a S45C steel base body and a coating(s) thereon and having a dimension of 8 × 12 × 40 mm |
| Opposing specimen (11): | A plate-shaped member formed of FC250 iron casting and having a dimension of 40 × 60 × 7 mm |
| Test unit: | Reciprocating friction/wear tester |
| Reciprocating motion: | 600 cycles per minute |
| Test temperature: | 25° C. |
| Load (P) applied: | 98 N |
| Test time: | 60 min |

The sliding members of Examples 1 to 4 had lower friction coefficients and smaller wear amounts than those of Comparative Examples 1 to 4, and the unexpected results of the present invention are clearly demonstrated in TABLE. Among others, Example 4 seems to provide the most favorable results at the present moment in view of the fact that the sliding member of Example 4 had a lower friction coefficient and a smaller wear amount that those of Examples 1 to 3.

As described above, the sliding member shows excellent low-friction characteristics and durability by combination of a certain structured hard carbon coating and a specific lubricant according to the present invention. It is therefore possible to obtain a greater improvement in fuel efficiency by the use of the sliding member of the present invention in an internal combustion engine, than that obtained by the use of a steel sliding member lubricated with a lubricating oil containing an organomolybdenum compound according to the earlier technology.

The entire contents of Japanese Patent Application No. 2003-206809 (filed on Aug. 8, 2003) and No. 2004-225411 (filed on Aug. 2, 2004) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

TABLE

| | Friction coefficient | Wear amount |
|---|---|---|
| Example 1 | 0.07 | 1.5 |
| Example 2 | 0.06 | 1.2 |
| Example 3 | 0.04 | 1.0 (Reference) |
| Example 4 | 0.02 | 1.0 |
| Comparative Example 1 | 0.18 | 5.4 |
| Comparative Example 2 | 0.17 | 3.5 |
| Comparative Example 3 | 0.15 | 2.0 |
| Comparative Example 4 | 0.13 | 1.8 |

What is claimed is:
1. A system comprising:
a first sliding member which comprises a base body and a diamond-like carbon coating formed on the base body to define a sliding surface for sliding contact with a second sliding member under lubrication;

a second sliding member which comprises a base body and a sliding surface for sliding contact with a first sliding member under lubrication, the sliding surface of the second sliding member comprising an iron-based material or an aluminum-based material; and
a lubricant disposed between the first sliding member and the second sliding member, the lubricant being either (i) a lubricating oil comprising poly-α-olefin as a base oil and an ashless fatty-ester friction modifier, or (ii) a lubricating agent consisting of glycerol,
wherein an outermost surface portion of the diamond-like carbon coating has a lower hydrogen content than that of a remaining portion of the diamond-like carbon coating.

* * * * *